Jan. 16, 1962 W. W. ASTON 3,016,635
C-BAR STRUCTURE
Filed Nov. 24, 1958 2 Sheets-Sheet 1
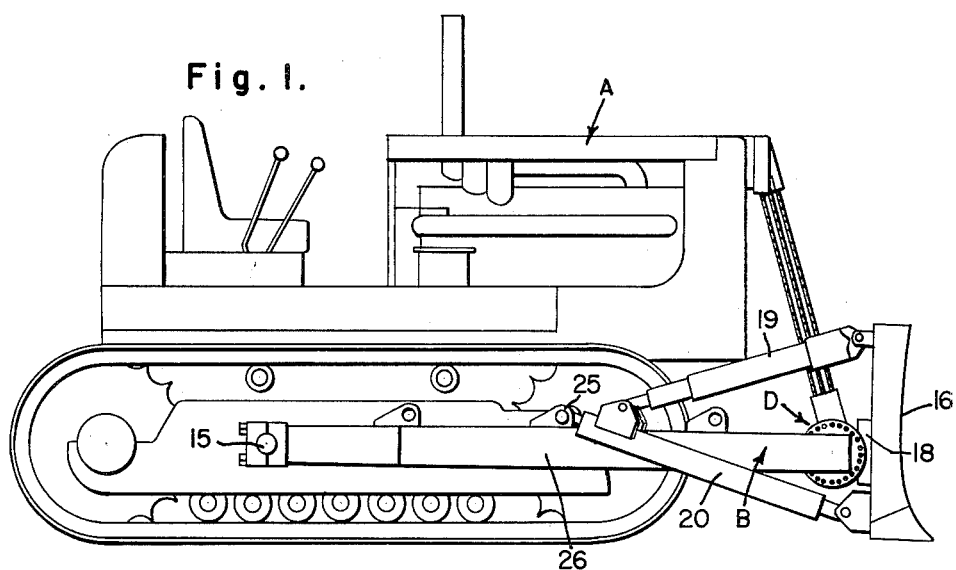
Fig. 1.
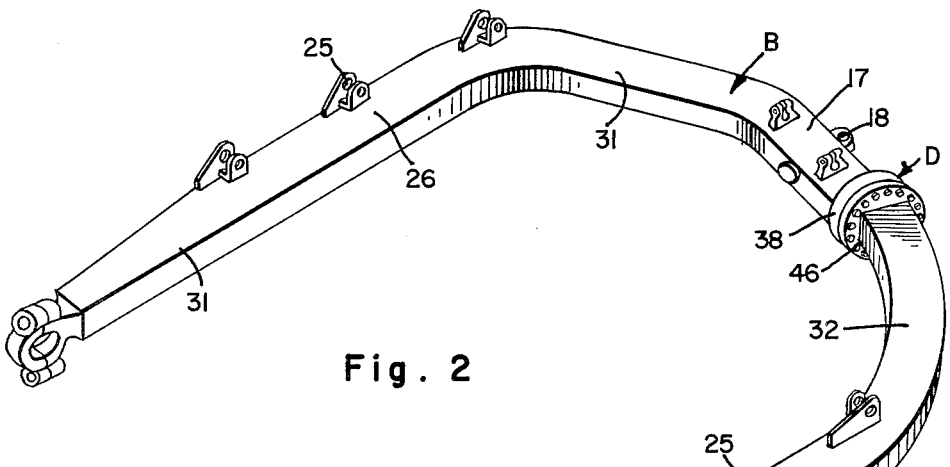
Fig. 2
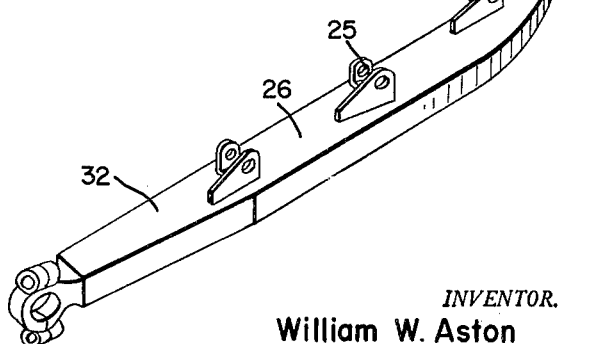
INVENTOR.
William W. Aston
BY
Townsend and Townsend
Attorneys

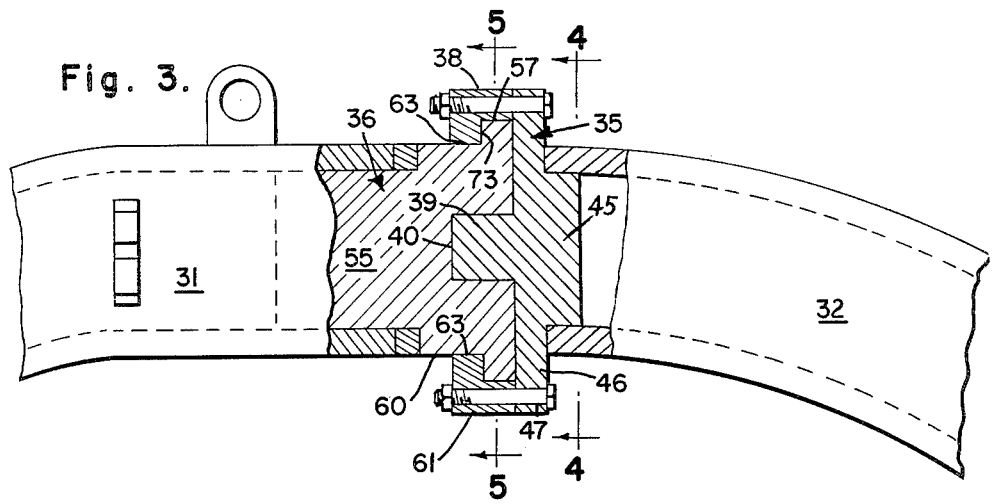
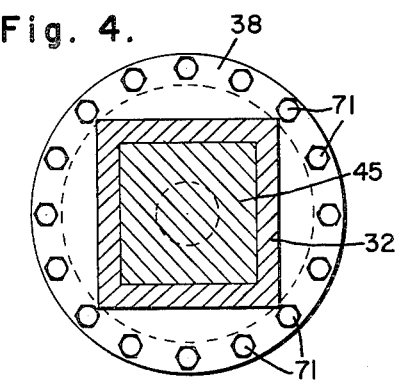
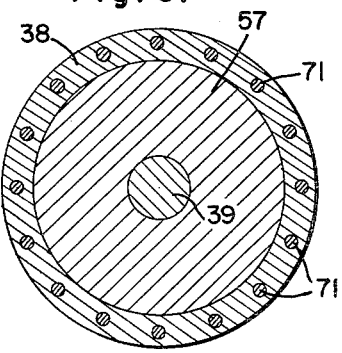
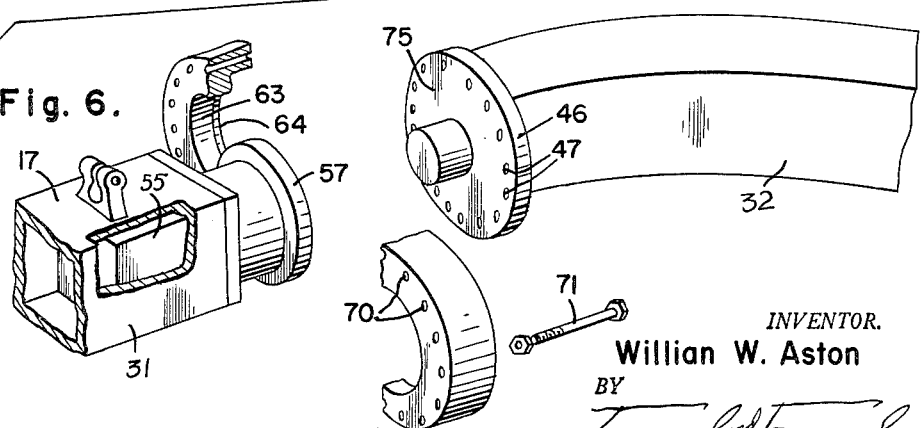
INVENTOR.
Willian W. Aston

United States Patent Office 3,016,635
Patented Jan. 16, 1962

3,016,635
C-BAR STRUCTURE
William W. Aston, Glenwood, Wash.
Filed Nov. 24, 1958, Ser. No. 775,851
4 Claims. (Cl. 37—144)

This invention relates to a C-bar structure for supporting dozer blades on tractors.

The ends of the legs of a C-bar are conventionally pivotally mounted adjacent the rear of a tractor with the web disposed in substantially horizontal position leading the front of the tractor. A dozer blade or other working tool is mounted on the web of the C-bar. It has been the practice to form the C-bars in two parts which are rigidly joined together at the web of the C-bar by two mating bolted together flanges. In that there is considerable force acting against the C-bar during operation of the tractor, an uneven load may tend to force one side of the C-bar in one direction and the other side of the C-bar in the opposite direction. Quite frequently this stress against the rigid web results in a fracture of the bar.

A principal object of this invention is to provide a yieldable connection joining the two half sections of the C-bar.

A feature and advantage of this invention is that the yieldable connection between the two sections has sufficient give to prevent the fracture of the C-bar when the dozer blade is unevenly loaded.

A further object of this invention is to provide a novel coupling for joining two members together by the provision of two mating annular flanges and a means for compressing the two flanges together so that the two members are aligned in axial alignment and frictionally held against relative rotational movement.

A feature and advantage of this invention is that the coupling maintains the C-bar as a rigid integral structure that is yieldable under conditions of excessive force so as to prevent a fracture of the C-bar.

A further object of this invention is to provide a novel means for joining two sections of the C-bar formed in such a way as to readily replace conventional flanges presently used to connect the two sections of the C-bar together.

A feature and advantage of this invention is that the conventional rigidly connected, two section, C-bar can be readily modified so as to be joined by the coupling means of this invention.

Other objects of the present invention will become apparent upon reading the following specification and referring to the accompanying drawings in which similar characters of reference represent corresponding parts in each of the several views.

In the drawings:

FIG. 1 is a side view of a tractor showing the C-bar mounted on the tractor and having a dozer blade mounted thereon.

FIG. 2 is a perspective view of the C-bar with the coupling of the invention joining the two sections of the C-bar.

FIG. 3 is a broken away sectional view showing the coupling device.

FIG. 4 is a cross-sectional view of FIG. 3 taken at line 4—4.

FIG. 5 is a cross-sectional view of FIG. 3 taken at line 5—5.

FIG. 6 is an exploded view showing the coupling device in disassembled relationship.

In the principal embodiment of the invention a tractor A is provided with a C-bar B which is journaled to shaft 15 at the lower rear portion of the tractor. A dozer blade 16 is pivotally mounted on web 17 of the C-bar as at 18. The top and bottom portions of the dozer blades 16 are adjustably supported by hydraulic units 19 and 20 mounted on bracket 25 of legs 26 of C-bar B.

C-bar B comprises two half sections 31 and 32 which are joined together to one side of center of web 17 by coupling D. Coupling D comprises a flanged member 35 mounted on the end of the web of section 32 which abuts with a flanged member 36 mounted on the end of section 31. The two flanged members 35 and 36 are held tightly together by a ring or collar 38 and in axial alignment by a plug 39 projecting forwardly from member 35 and nesting in socket 40 in member 36.

Member 35 is attached to the end of the section 32 by welding to the outer wall of the section and by the provision of a plug member 45 which fits interiorly into the hollow bore of the square section and is there welded by spot welds or the like. Member 35 is formed with an annular flange 46 having a plurality of equally spaced apertures 47. Flanged member 36 is similarly connected to half-section 31 with a plug 55 nested within the bore of the square section and welded securely thereto. Member 36 is formed with a flange 57 which has a smaller diameter than flange 46 of member 35. Member 36 is provided with a cylindrical neck 60. Collar 38 is installed about neck 60 prior to the member 36 being installed on section 31.

As indicated in FIG. 3 of the drawings collar 38 is L-shaped in cross section, formed with an annular wall 63 which forms a bearing about neck 60. Collar 38 is provided with a second annular wall 63 having a bore diameter equaling the outside diameter of flange 57 and having a thickness substantially equal to the thickness of flange 57. Collar 38 is provided with a plurality of apertures 70 which are in alignment with the apertures 47 of flange 46. Bolts 71 are arranged to pass through apertures 47 and 70 so as to tightly compress collar 38 against flange 46 with flange 57 being nested between the rear wall 73 of the collar, and annular wall 64 of collar 38 and the front face 75 of flange 46. It is obvious that the tension of the device can be controlled by the extent of pressure applied through the tightening of bolts 71.

Plug 39 is cylindrical in cross section and is axially aligned with mating recess 40. When the two sections 31 and 32 are joined together plug 39 fits into recess 40 and aligns the two sections so that their web is in axial alignment. Collar 38 is then snugly abutted against flange 57 and thence attached to flange 46 by installing and tightening bolts 71. The collar exerts sufficient pressure against flange 57 to cause frictional resistance between the two sections to resist rotating movement of the two sections relative to one another. However, should excessive force be applied, the joint D will yield thus forming a yieldable means to prevent the fracture of the C-bar.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a device for joining the ends of a web of two half-sections of a C-bar of the type supporting working tools on the front of a tractor the combination of: round flanges mounted on the ends of said web sections; each flange having a diameter greater than the maximum cross-sectional dimension of the web; a first said flange having a greater diameter than the second said flange; a collar mounted over the second flange having an outer diameter greater than said second flange and an inner diameter substantially less than said second flange; said flanges each formed with mating flat faces positioned to align said web sections in axial alignment when the faces are juxtaposed in axial alignment; and means rigidly attaching said first flange and said collar together to tightly compress said second flange and said first flange together.

2. A combination according to claim 1 and wherein one of the flange faces is provided with a cylindrical protuberance and the other of said faces is provided with a mating cylindrical recess; said recess and said protuberance each being disposed in axial alignment with said web sections.

3. In a device for joining the ends of a hollow web of two half-sections of a C-bar of the type supporting working tools on the front of a tractor the combination of: a first disk shaped member; a hub mounted on the rear of said disk shaped member and having a cross-section substantially equal to the interior of the web; said hub securely mounted within the end of one web section with the disk being on a plane normal to the longitudinal axis of the web section; a second disk shaped member; a hub mounted on the rear of said second disk shaped member and having a cross-section equal to the interior of the web; said hub of said second disk shaped member being mounted within the opposite end of the web with the disk shaped member being on a plane substantially normal to the longitudinal axis of the second web shaped section; each said member having a diameter substantially greater than the cross-sectional diameter of said respective web sections; said second member having a diameter substantially smaller than said first member; a collar rotatably mounted on the second member against the face of the member facing the web section to which it is attached; means to hold said members with said webs in axial alignment; and means to rigidly connect said collar against said first member to frictionally compress said second member against said first member.

4. In a device for joining the ends of a hollow web of two half-sections of a C-bar of the type supporting working tools on the front of a tractor the combination of: a first flanged disk; means mounted on said disk and secured on the interior of the end of one web section with the first disk being on a plane normal to the longitudinal axis of said web section; said first disk having an outer diameter substantially greater than the largest cross-sectional dimension of the attached web section; a cylindrical neck; said cylindrical neck being mounted on the end of the opposite web section by means on the interior of said opposite web section; a second flanged disk mounted on said cylindrical neck on a plane substantially normal to the longitudinal axis of the attached web section; the center axis of said second disk, said neck and the attached web section being in coaxial alignment; said second disk having a diameter substantially smaller than said first disk; a collar rotatably mounted on said neck; said collar having an inner diameter substantially equal to the diameter of said neck and an outer diameter substantially greater than the diameter of said second disk; and means to rigidly connect said collar to said first disk to compress said first disk against said second disk while allowing relative rotational movement between said disks.

References Cited in the file of this patent

UNITED STATES PATENTS

| 458,408 | Schwanhausser | Aug. 25, 1891 |
| 521,677 | Smith | June 19, 1894 |
| 755,952 | Smith | Mar. 29, 1904 |
| 1,592,304 | Keyes | July 13, 1926 |
| 2,232,672 | Low | Feb. 18, 1941 |
| 2,412,574 | French | Dec. 17, 1946 |

FOREIGN PATENTS

| 75,252 | Germany | Sept. 22, 1893 |
| 227,981 | Great Britain | Jan. 25, 1925 |
| 428,179 | Great Britain | May 8, 1935 |